3,277,110
CERTAIN 5-NITRO-2-FURYL-1,2,4-TRIAZOLES
Homer Albert Burch, Norwich, N.Y., assignor to The Norwich Pharmacal Company, a corporation of New York
No Drawing. Filed Mar. 10, 1965, Ser. No. 438,743
7 Claims. (Cl. 260—308)

This application is a continuation-in-part of my copending application Serial No. 336,643, filed January 9, 1964.

This invention relates to new chemical compounds. More particularly, it is concerned with a new series of nitrofuran compounds, 5-nitro-2-furyl-1,2,4-triazoles of the formula:

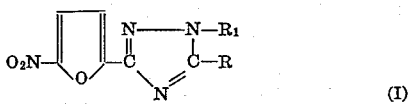

(I)

wherein R is a member of the group consisting of hydrogen and lower alkyl, preferably 1–4 carbon atoms; and $R_1$ is a member of the group consisting of hydrogen, methyl, acetyl and methylcarbamoyl.

These new compounds possess a high order of antibacterial activity being inimical in very small amounts to gram-positive and gram-negative bacteria such as *Staphylococcus aureus*, *Streptococcus pyogenes*, *Escherichia coli*, *Proteus vulgaris* and *Erysipelothrix insidiosa*. They are thus adapted to be combined with conventional, commonly used carriers to form disinfectant compositions. In such use they are commonly compounded in the form of dusts, sprays, suspensions, solutions, tablets, ointments and the like using excipients and adjuvants well known in the art for such purpose.

The compounds of Formula I are not limited in their antibacterial efficacy to solely in vitro effect; for, upon oral administration to animals infected with pathogenic organisms such as *Staphylococcus aureus*, *Salmonella typhosa* or *Escherichia coli*, they provide protection against death. Thus, when administered perorally to mice lethally infected by the aforementioned organisms in doses of from 40–150 mg./kg., they are capable of preventing mortality due to such infective forces. Such administration also presents antibacterial serum levels of these compounds making them valuable systemic chemotherapeutic.

The preparation of the compounds of Formula I wherein R is aforesaid is readily carried out. The method which is currently preferred consists in contacting an N-alkanoylamido-5-nitro-2-furamidine with an agent capable of causing ring closure. Suitable agents for this purpose are phosphorus oxychloride or glacial acetic acid. It is advantageous to supply heat to the mixture to hasten the reaction. When the reaction is complete, the mixture is quenched and the solid product filtered. For purification purposes the solid may be recrystallized from suitable solvents such as aqueous solutions of ethanol or acetic acid. The introduction of the appropriate $R_1$ substituent is readily accomplished by means of an acylating agent such as acetic anhydride or methyl isocyanate or by means of an alkylating agent such as methyl iodide in the presence of a base.

In order that this invention may be fully available to and understood by those skilled in the art, the following illustrative examples are presented:

EXAMPLE I 5-methyl-3-(5-nitro-2-furyl)-1H-1,2,4-triazole (NF–1030)

A 2-l., 3-neck flask, fitted with a stirrer, condenser, and a stopper is charged with 50 gms. (0.68 mole) of acetyl hydrazide, 150 gms. (0.68 mole) of ethyl 5-nitro-2-furamidate hydrochloride, 38 gms. (0.7 mole) of sodium methylate, and 850 ml. of methyl alcohol. The mixture is heated on a steam bath for 30 minutes. After evaporating the methyl alcohol in vacuo on a warm water bath, the residue is poured into water to give a brown solid in a yield of 120 gms. (83.5%). This crude product (50 gms.) is slurried in acetone to give the 43 gms. of N-acetamido-5-nitro-2-furamidine melting at 217–218°. It may be recrystallized from ethanol to raise the melting point to 224–225°.

Anal.—Calcd. for $C_7H_5N_4O_4$: C, 39.64; H, 3.80; N, 26.41. Found: C, 39.76, 39.79; H, 4.06, 4.11; N, 26.32, 26.35.

METHOD A

A solution of 51.0 g. (0.24 mole) of N-acetamido-5-nitro-2-furamidine in 200 ml. of phosphorus oxychloride is refluxed for 1 hour. The cooled mixture is poured into ice water and stirred for 1 hour. The crude product is collected by filtration, washed with cold water and air dried to give a yield of 23.3 g. (50%). Recrystallization from dilute aqueous ethanol gives the title product as pale yellow needles melting at 254.5–256° dec.

Anal.—Calcd. for $C_7H_6N_4O_3$: C, 43.30; H, 3.12; N, 28.86. Found: C, 43.39, 43.36; H, 3.46, 3.28; N, 28.69, 28.78.

METHOD B

A solution of 40.0 g. (0.19 mole) of N-acetamido-5-nitro-2-furamidine in 200 ml. of glacial acetic acid is refluxed for three hours. Upon cooling the mixture, the title product separates as tan crystals which are filtered, washed with water and dried at 60° to give 28.0 g. (76.5%); M.P. 250–255° dec.

EXAMPLE II 5-ethyl-3-(5-nitro-2-furyl)-1H-1,2,4-triazole (NF–1045)

To a solution of 10.5 g. (0.195 mole) of sodium methylate in 380 ml. of methanol is added 43 g. (0.195 mole) of ethyl 5-nitro-2-furamidate hydrochloride and 17.2 g. (0.195 mole) of propionyl hydrazide. The resulting mixture is boiled for 45 minutes. The solvent is removed in vacuo on a steam bath and the residue is stirred in 500 ml. of ice water. The crude product is collected and recrystallized from ethanol. The product, N-propionamido-5-nitro-2-furamidine, separates as red needles melting at 204–205° in a yield of 21.6 g. (49%). Additional recrystallizations raise the melting point to 207–207.5°.

Anal.—Calcd. for $C_8H_{10}N_4O_4$: C, 42.48; H, 4.46; N, 24.77. Found: C, 42.56, 42.44; H, 4.54, 4.49; N, 24.48, 24.41.

A solution of 80.0 g. (0.35 mole) of N-propionamido-5-nitro-2-furamidine in 240 ml. of glacial acetic acid is refluxed for ca. 4 hours. The hot reaction mixture is treated with charcoal and filtered by suction. The filtrate is diluted with an equal volume of water and chilled. The crude product is collected by filtration and washed with cold water. Recrystallization from dilute aqueous acetic acid gives the title product as light tan needles melting at 181.5–183.5° in a yield of 37.7 g. (51.5%).

Anal.—Calcd. for $C_8H_8N_4O_3$: C, 46.15; H, 3.87; N, 26.92. Found: C, 46.08, 46.21; H, 3.94; 3.75; N, 26.84, 26.66.

EXAMPLE III 3-(5-nitro-2-furyl)-1H-1,2,4-triazole (NF–1065)

To a solution of 30.0 g. (0.55 mole) of sodium methylate in 1 l. of methanol is added 121 g. (0.55 mole) of ethyl 5-nitro-2-furamidate hydrochloride and 33.0 g. (0.55 mole) of formhydrazide. The solution is boiled for 1 hour after which the solvent is removed in vacuo on a steam bath. The residue is shaken with 400 ml. of ice water and filtered. Recrystallization of the solids from ethanol gives the product, N-formamido-5-nitro-2-furamidine, as yellow needles in a yield of 27.3 g. Dilution of the filtrate with 250 ml. of water and further chilling gives an additional 6.2 g. The total yield is 33.5 g. (30.6%). The product melts at ca. 180°, solidifies and decomposes at 259–260°.

*Anal.*—Calcd. for $C_6H_6N_4O_4$: C, 36.37; H, 3.05; N, 28.28. Found: C, 36.59, 36.65; H, 3.34, 3.22; N, 28.27, 28.39.

A solution of 34 g. (0.17 mole) of N-formamido-5-nitro-2-furamidine in 110 ml. of glacial acetic acid is refluxed for 4 hours. The mixture is chilled and the crude product is collected by filtration. Recrystallization from dilute aqueous acetic acid gives the title product as pale tan micro crystals decomposing at 252–254° in a yield of 8.4 g. (27.4%). Further recrystallization raises the decomposition point to 259–260°.

*Anal.*—Calcd. for $C_6H_4N_4O_3$: C, 40.01; H, 2.24; N, 31.31. Found: C, 40.00; H, 2.26; N, 31.53.

EXAMPLE IV

*1-methylcarbamoyl-3-(5-nitro-2-furyl)-1H-1,2,4-triazole (NF–1223)*

A solution of 50 g. (0.278 mole) of the compound of Example III in 300 ml. of dimethylformamide containing 50 ml. of methyl isocyanate is heated on a steam bath with stirring for 45 minutes. The hot solution is treated with charcoal, filtered, cooled, diluted with 300 ml. of water and chilled thoroughly. The product is filtered and washed thoroughly with water. Recrystallization is effected rapidly by treating portions of the product with boiling ethanol, filtering the mixture rapidly by suction and cooling the filtrate as quickly as possible. The title product separates as long yellow needles melting at 188–190° (corr.) with resolidification and decomposition at 257–259° (corr.). The yield is 31.5 g. (47.7%).

*Anal.*—Calcd. for $C_8H_7N_5O_4$: C, 40.51; H, 2.97; N, 29.53. Found: C, 40.75; H, 3.18; N, 29.45.

EXAMPLE V

*1-acetyl-3-(5-nitro-2-furyl)-1H-1,2,4-triazole (NF–1226)*

A solution of 45 g. (0.25 mole) of the compound of Example III in 300 ml. of acetic anhydride is heated on a steam bath for 2 hours. The solvent is removed in vacuo after which the residue is recrystallized from ethanol. The product separates as pale yellow needles melting at 167–168° (corr.) in a yield of 38.6 g. (69.5%).

*Anal.*—Calcd. for $C_8H_6N_4O_4$: C, 43.25; H, 2.72; N, 25.22. Found: C, 43.40; H, 2.72; N, 25.28.

EXAMPLE VI

*1,5-dimethyl-3-(5-nitro-2-furyl)-1,2,4-triazole (NF–1103)*

To a stirred suspension of 40 g. (0.21 mole) of the compound of Example I in 1 l. of methanol is added 11.3 g. (0.21 mole) of sodium methylate. After refluxing the mixture for 20 minutes, 40 ml. of methyl iodide is added dropwise during 10 minutes. The mixture is refluxed for an additional 1.5 hours. The solvent is removed in vacuo on a steam bath; the residue is slurried with cold water and filtered. Recrystallization from methanol gives the title product as yellow needles melting at 178–180° in a yield of 15 g. (34.4%). Recrystallization raises the melting point to 184.5–185° (corr.).

*Anal.*—Calcd. for $C_8H_8N_4O_3$: C, 46.15; H, 3.87; N, 26.92. Found: C, 46.25; H, 4.06; N, 26.76.

What is claimed is:

1. A compound of the formula:

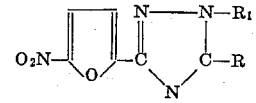

wherein R is a member of the group consisting of hydrogen and lower alkyl; and $R_1$ is a member of the group consisting of hydrogen, methyl, acetyl and methylcarbamoyl.

2. 5-methyl-3-(5-nitro-2-furyl)-1H-1,2,4-triazole.
3. 5-ethyl-3-(5-nitro-2-furyl)-1H-1,2,4-triazole.
4. 3-(5-nitro-2-furyl)-1H-1,2,4-triazole.
5. 1-acetyl-3-(5-nitro-2-furyl)1H-1,2,4-triazole.
6. 1-methylcarbamoyl-3-(5-nitro-2-furyl)-1H-1,2,4-triazole.
7. 1,5-dimethyl-3-(5-nitro-2-furyl)-1H-1,2,4-triazole.

References Cited by the Examiner

UNITED STATES PATENTS

| | | | |
|---|---|---|---|
| 2,723,274 | 11/1955 | Kaiser | 260—308 |
| 2,898,343 | 8/1959 | Klingsberg | 260—308 |
| 2,953,491 | 9/1960 | Hardy et al. | 167—33 |
| 2,959,518 | 11/1960 | Speziale et al. | 167—33 |

ALEX MAZEL, *Primary Examiner.*

ALTON D. ROLLINS, *Assistant Examiner.*